June 5, 1928.

M. WILFART 1,672,670

ELECTRIC MOTOR CONTROL SYSTEM AND APPARATUS

Filed July 17, 1924      2 Sheets-Sheet 1

Inventor
Maurice Wilfart
by
His Attorney

June 5, 1928.

M. WILFART 1,672,670

ELECTRIC MOTOR CONTROL SYSTEM AND APPARATUS

Filed July 17, 1924    2 Sheets-Sheet 2

Inventor
Maurice Wilfart
by
His Attorney

Patented June 5, 1928.

1,672,670

UNITED STATES PATENT OFFICE.

MAURICE WILFART, OF PARIS, FRANCE, ASSIGNOR TO GENERAL ELECTRIC COMPANY, A CORPORATION OF NEW YORK.

ELECTRIC MOTOR-CONTROL SYSTEM AND APPARATUS.

Application filed July 17, 1924, Serial No. 726,621, and in France August 8, 1923.

My invention relates to the control of electric motors and more particularly to motor control systems and apparatus wherein motor controlling switch mechanism is operated through differential gearings responsively to predetermined speed relations between a driving motor and a master motor.

My invention provides an improved form of motor controlling switch mechanism of the differential type which is operated with a snap action when the predetermined speed relations between the driving motor and the master motor occur, and which has an operating connection between the differential gearing and the switch mechanism to permit continued operation of the motors at other than the predetermined speed relation.

The present invention also provides a system of motor control of the above character that insures the automatic acceleration as well as deceleration of a driving motor which is arranged to cooperate with a fly wheel of large inertia in operating machines having widely varying load characteristics such as rolling mills and the like.

Furthermore, my invention may be applied advantageously to control a short circuit around a speed regulating resistance for a reversible electric motor, particularly where the motor is employed in hoisting or elevator service wherein the motor is subjected to an overhauling load. In such application by invention automatically effects the short circuiting of the speed regulating resistances when the motor operates above a predetermined speed in either direction, and where the motor is plugged by reversing the connections to the supply source, the short circuit around the regulating resistances is automatically opened while the motor is reversing and accelerating to the predetermined speed in the opposite direction.

Figure 3:
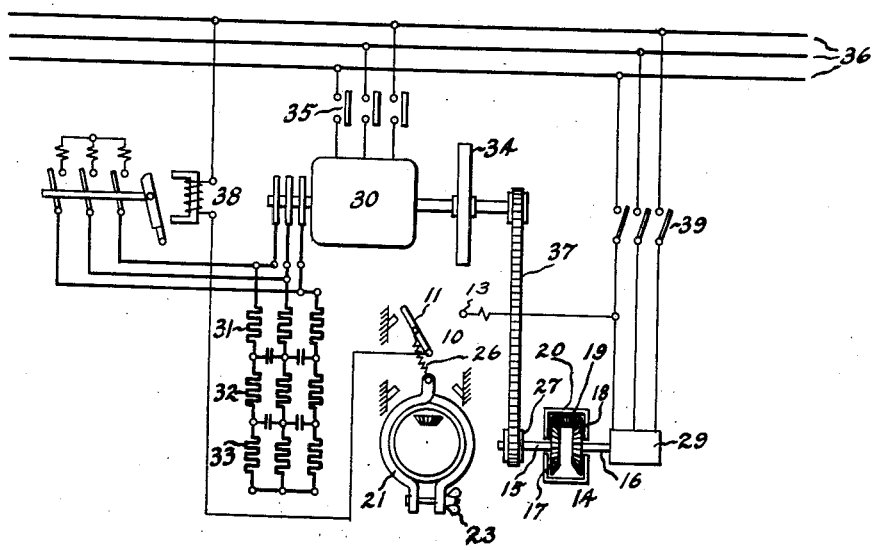
Figure 2:
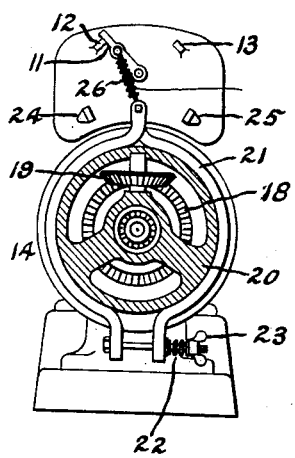
Figure 1:
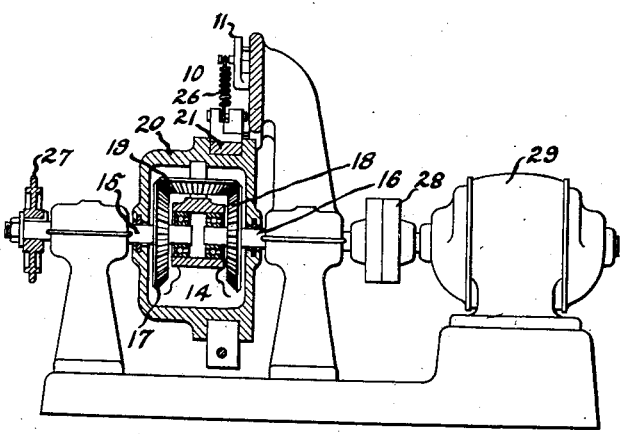
Figure 4:
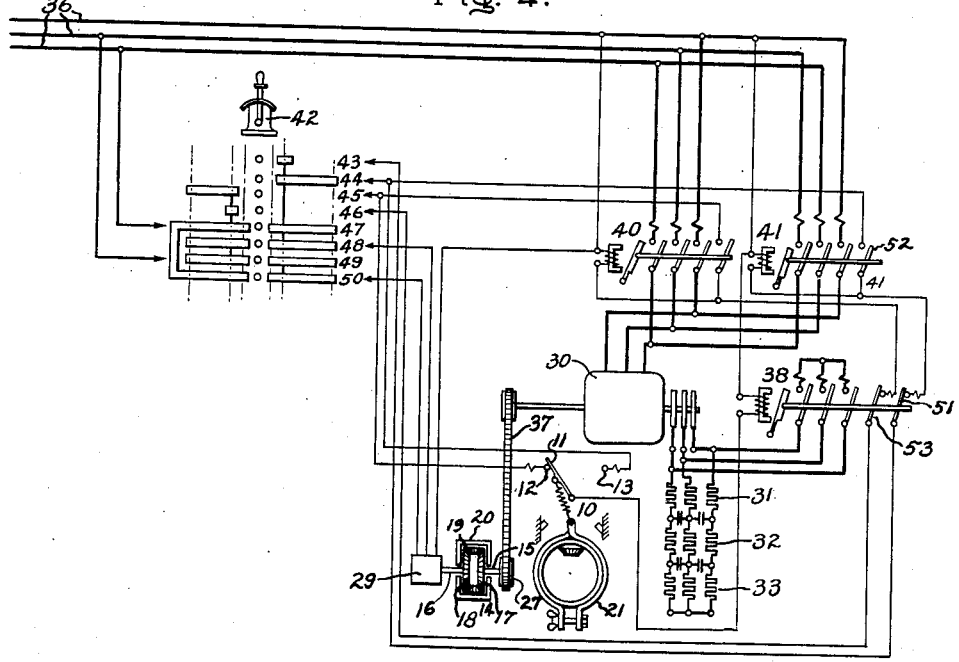
Figure 5:
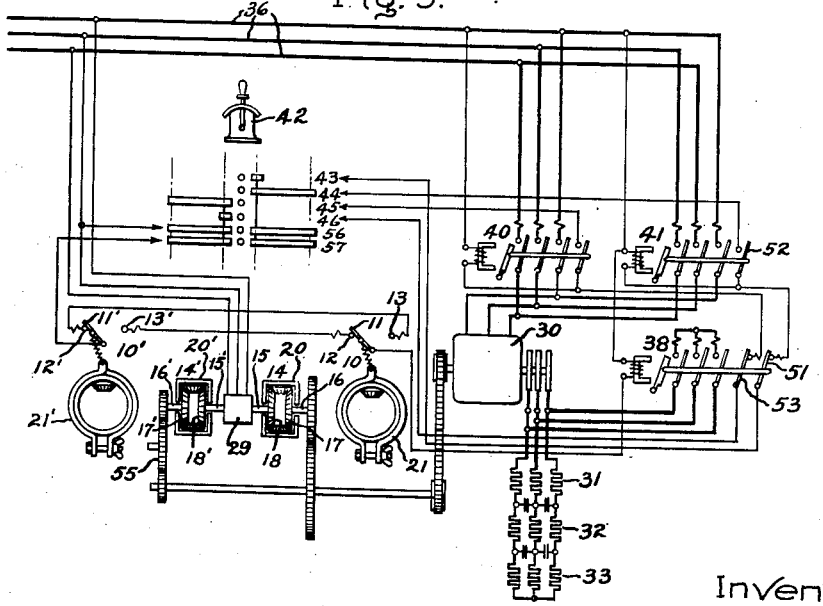

For a better understanding of my invention reference is had to the following description taken in connection with the accompanying drawing in which Fig. 1 is a front elevation, partially in section, of a preferred form of my improved motor controlling mechanism of the differential type, and Fig. 2 is an end view, also in section, of the mechanism shown in Fig. 1, Fig. 3, diagrammatically illustrates a control system embodying my invention in a form suitable for controlling an alternating current induction motor arranged to cooperate with a fly wheel in driving a variable load, Fig. 4 shows the invention applied to the control of a reversing electric motor and Fig. 5, shows a modified form of my improved controlling apparatus of the differential type applied in a reversing motor control system similar to that shown in Fig. 4.

The novel features which I believe to be characteristic of my invention are set forth with particularity in the appended claims.

Referring first to Figs. 1 and 2 of the drawings which illustrate a preferred form of my invention, it will be seen that the differential switch mechanism 10 comprises essentially a pivoted circuit controlling member 11 which is operated into engagement with the cooperating stationary contacts 12 and 13 by means of a differential gear mechanism 14 which connects the two rotatable shafts 15 and 16.

As shown the rotatable shafts 15 and 16 are disposed in axial alignment and are suitably secured respectively to the beveled gears 17 and 18 of the differential mechanism 14. The differential mechanism 14 is of the well known type ordinarily employed in the construction of automobiles, and has a beveled planet pinion 19 carried by the planet frame 20 in mesh with the opposing beveled gears 17 and 18. It will be understood however that other types of differential mechanism may be employed if desired.

The planet frame 20 is rotatably supported upon the aligned shafts 15 and 16 and is provided with a circular drum surface on the periphery thereof. A friction band 21 encircles the cylindrical drum surface of the planet frame 20 and is maintained in frictional engagement therewith by means of the compression spring 22 and the adjustable thumb nut 23. A suitable shoulder on the upper side of friction band 21 is arranged to engage with the stationary stops 24 and 25 to limit the movement of band 21, when the planet frame 20 is rotated. The shoulder of friction band 21 is connected to the pivoted circuit controlling member 11 through the tension spring 26 as shown.

The rotatable shaft 15 is provided with a sprocket gear 27 or other suitable means through which the shaft 15 may be driven by an electric motor and the rotatable shaft 16 is connected through a suitable coupling 28 to a master motor 29, which may be an electric motor as shown.

If desired either of the rotatable shafts 15 and 16 may be driven through speed changing mechanisms such as for example cone pulleys or a gear box.

With the motor controlling mechanism thus constructed and arranged, it will be evident that as long as the beveled pinion 17 on the rotatable shaft 15 is rotated at the same speed as the beveled pinion 18 on rotatable shaft 16 and in an opposite direction, the planet pinion 19 will rotate about its axis and the planet frame 20 will remain stationary. If, however, the speed of the beveled gear 17 is increased or decreased the planet pinion 19 together with the planet frame 20 will be rotated in one or the other direction. Should the planet frame 20 be rotated in a clockwise direction from the position shown in Fig. 2, the friction band 21 will be moved through a limited angular distance into engagement with stop 25 and thus will elongate the tension spring 26 connecting the same to the circuit controlling member 11. When the tension spring 26 is carried over the pivotal support of the circuit controlling member 11, the latter is operated with a snap action from the position shown into engagement with the stationary contact 13. Likewise when the planet frame 20 is rotated in a counterclockwise direction, the friction band 21 is carried to the left until the shoulder thereof engages with the stop 24. As the tension spring 26 again passes over the pivotal support, the circuit controlling member 11 is returned into engagement with the stationary contact 12 with a snap action. Due to the frictional engagement between the planet frame 20 and the friction band 21, the beveled gear 17 may continue to rotate at a greater or lesser speed than that of the bevel gear 18 and in the same or the opposite direction without damage to the motor controlling mechanism.

Referring now to Fig. 3, which diagrammatically shows a control system embodying my improved motor controlling apparatus, a driving motor 30 of the three phase alternating current type, having the speed regulating resistances 31, 32 and 33 connected in the secondary circuit thereof, is arranged to cooperate with the fly wheel 34 in driving a variable load such as for example a rolling mill. The line switch mechanism 35 is provided for connecting the motor to the supply lines 36 and suitable starting switch mechanism as diagrammatically indicated in the drawing is provided for short circuiting the resistances 33 and 32 during the starting of motor 30.

In order to automatically control the speed regulating resistance 31 so as to accelerate and decelerate the motor 30 from a predetermined speed, and thereby store energy in the fly wheel 34 during light load and permit the same to be expended in driving a heavy load, the driving motor 30 is connected by means of the chain 37 to drive the shaft 15 of the differential switch mechanism 10 and the circuit controlling member 11 is arranged to control the energization of the electromagnetic switch 38 to open and close a short circuit around the resistance 31.

In the system illustrated, the master motor 29 may be a three phase induction motor or a synchronous motor which is connected through the line switch 39 to the supply lines 36, so as to rotate the shaft 16 of the differential switch mechanism 10 at a substantially constant speed and in an opposite direction to the shaft 15.

With the line switches 35 and 39 closed, and the motors 30 and 29 operating, the starting resistances 32 and 33 of the former being short circuited, the speed regulating resistance 31 is automatically controlled in the following manner: When the motor 30 drives the fly wheel 34 and the variable load at a speed above that at which the speed of the shaft 15 equals the speed of shaft 16, the planet frame 20 together with the friction band 21 will rotate in a clockwise direction. This operates the circuit controlling member 10 from the position shown into contact with the stationary contact 13 and closes an energizing circuit for the operating winding of the electromagnetic switch 38. The resulting closure of switch 38 short circuits the speed regulating resistance 31 and the speed of motor 30 is further increased, thereby storing energy in fly wheel 34. When the variable load driven by motor 30 becomes excessive so that the motor 30 and the fly wheel 34 are slowed down below the speed at which shaft 15 equals that of shaft 16, the planet frame 20 together with the friction band 21, will rotate in a counterclockwise direction and operate the circuit controlling member 10 out of engagement with the stationary contact 13 with a snap action. This deenergizes the electromagnetic switch 38 which thereupon returns to the position shown and opens the short circuit around the speed controlling resistance 31. This serves to further decrease the speed of motor 30 and permits the fly wheel 34 to expend the kinetic energy stored in the fly wheel 34 during the accelerating period in driving the load. When the load again becomes normal the speed of motor 30 again increases and rotates the shaft 15 at a greater speed than that of shaft 16. Thereupon the circuit controlling member 10 is operated into engagement with the stationary contact 13 in a manner similar to that previously described, and the electromagnetic switch 38 again responds to short circuit the resistance 31 and further accelerate the motor 30 and the fly wheel 34.

Thus it will be seen that when the speed of motor 30 decreases below a predetermined value the speed regulating resistance 31 is controlled to further decrease the speed of motor 30 and when the speed of motor 30 exceeds the predetermined value the speed controlling resistance 31 is automatically controlled to further increase the speed of motor 30. With my improved control system the automatic control of motor 30 is independent of frequency or voltage changes in the supply line 36.

In the control system embodying my invention as shown in Fig. 4, the induction motor 30 of the three phase alternating current type having the speed regulating resistances 31, 32 and 33 in the secondary circuit is connected through mechanical gearing (not shown), to drive an active load such as for example a hoist or elevator. A pair of electromagnetic reversing switches 40 and 41 are provided for connecting the motor 30 to the supply lines 36 for operation in either direction and the master controller 42 is arranged to control the reversing switches 40 and 41 together with suitable switch mechanism (not shown) for short circuiting the speed controlling resistances 32 and 33. The differential switch mechanism 10 is connected to the three phase alternating current master motor 29 and the driving motor 30 as previously described and is arranged to cooperate with the master controller 42 in controlling the electromagnetic short circuiting switch 38 for speed regulating resistance 31 in the following manner:

When the master controller 42 is operated from the "off" position in which it is shown to the right to operate the motor 30 in a clockwise direction which may be assumed to be the down direction of the elevator, a circuit is established in the first position through the cooperating stationary contacts and segment 48 and 50 for energizing the pilot motor 29 for operation in a counter-clockwise direction. Master motor 29 at once accelerates and rotates the bevel gear 18 at a substantially constant speed in a counterclockwise direction. This causes the planet frame 20 to rotate in a counterclockwise direction and maintain the circuit controlling member 11 in contact with the stationary contact 12 as shown. Upon operation of master controller 42 to the second position, an energizing circuit for the operating winding of electromagnetic reversing switch 41 is established from the lower of the supply lines 36 through the contact segment 47, the contact segment 43, the auxiliary contact 51 of the electromagnetic switch 38, and through the operating winding of electromagnetic switch 41 to the upper of the supply lines 36. Upon response of electromagnetic switch 41, motor 30 is connected to supply line 36 and a holding circuit for the operating winding thereof is established through contact segment 44 and the auxiliary switch 52. Further movement of master controller 42 to the right effects the short circuiting of the resistances 33 and 32 by means of switch mechanism indicated in the drawing to accelerate motor 30.

When the speed of motor 30 increases so that the bevel gear 17 rotates in a clockwise direction at a speed greater than that of bevel gear 18, the planet frame 20 together with the friction band 21 will be rotated in a clockwise direction and operate the circuit controlling member 10 from the position shown into engagement with the stationary contact 13. This completes an energizing circuit for the operating winding of electromagnetic switch 38 from the lower of the supply conductors 36 through the contact segment 47 the contact segment 44, the stationary contact 13, the circuit controlling member 10 and the operating winding of the electromagnetic switch 38 to the upper supply line 36. Switch 38 at once closes and short circuits the resistance 31, thereby accelerating the motor 30 to full operating speed.

Should the load tend to overhaul and drive motor 30 above synchronous speed the motor then operates as an induction generator and the differential switch mechanism 10 insures that the speed controlling resistances 31, 32 and 33 are maintained short circuited to produce a maximum braking effect.

If it is desired to stop the descent of an overhauling load by reversing the connection of motor 30 so as to produce an opposing torque, the master controller 42 is thrown from the right hand position through the off position to the second left hand position. In the "off" position, the line switch 41 together with the resistance controlling switch 38 are deenergized and opened according to their bias to respectively disconnect the motor 30 from the supply line 36 and interrupt the short circuit around the speed regulating resistance 31. In the first of the left hand positions the connections of the pilot motor 29 to the supply line 36 are reversed and motor 29 rotates the bevel gear 18 in the clockwise direction and maintains the circuit controlling member 10 in contact with the stationary contact 13. In the second left hand position of master controller 42 an energizing circuit for the operating winding of the electromagnetic reversing switch 40 is completed from the lower of the supply lines 36 through the contact segment 46, the auxiliary contact 53 of switch 38 and the operating winding of switch 40 to the upper supply line 36. Reversing switch 40 thereupon is operated to the closed position and reverses the connections of motor 30 to the supply line 36.

The opposing torque of motor 30 with the resistances 31, 32 and 33 in the secondary circuit soon brings the overhauling load to a standstill. Thereupon the master controller 42 may be returned to the off position to apply the usual electromagnetic friction brakes or may be moved to the extreme left hand position to accelerate motor 30 in the counterclockwise direction. In the latter case when the speed at which the bevel gear 17 is driven by the motor 30 exceeds that of the bevel gear 18, the planet frame 20, together with the friction band 21 will be angularly displaced to the left and operate the circuit controlling member 10 into engagement with contact 12, and establish an energizing circuit for the operating winding of the resistance controlling switch 38 from the lower of the supply line 36 through the contact segments 47 and 45 of the master controller 42, the stationary contact 12 and the circuit controlling member 10 and then through the operating winding of switch 38 to the upper of the supply line 36. Upon the resulting closure of switch 38 the resistance 31 is again short circuited to accelerate the motor 30 to full running speed in the up direction.

Thus it will be seen that by means of my invention the secondary resistances of motor 30 are maintained short circuited during regenerative braking and are automatically inserted in the secondary circuit of motor 30 during the plugging operation thereof.

Fig. 5 illustrates a modification of the motor control system shown in Fig. 4 which is adapted for hoisting or elevator service requiring frequent reversals of the driving motor. In the modified control system as shown the necessity for reversing the master motor 29 is eliminated by providing an additional differential switch mechanism 10' which is connected through a reversing gear 55 to the motor 30 and is arranged to cooperate with the differential switch mechanism 10 in controlling the electromagnetic switch 38 in the following manner.

When the master controller 42 is operated to the right to energize the electromagnetic reversing switch 41 through the contacts 43 and 51 as previously described and thereby connect the motor 30 to the supply line 36 for operation in a clockwise direction, the latter starts and rotate the bevel gear 17 in a counterclockwise direction and the bevel gear 17' in a clockwise direction.

The master motor 29 is connected permanently to the supply lines 36 so as to rotate the two bevel gears 18 and 18' always in a counterclockwise direction. Under these conditions it will be evident that the planet frames 20 and 20' together with the friction bands 21 and 21' are operated from the position shown in a counterclockwise direction to maintain the circuit controlling member 10 and 10' in their respective positions as shown. As the master controller 42 is operated through the successive right hand positions to effect the short circuiting of the speed controlling resistances 33 and 32 as previously explained the motor 30 is accelerated to a speed at which the bevel pinion 17' rotates in a clockwise direction faster than the bevel gear 18' is rotated in the counterclockwise direction. Thereupon the planet frame 20' and the cooperating friction band 21' are operated in a clockwise direction to effect disengagement of circuit controlling member 11' from the stationary contact 12' and the engagement thereof with the stationary contact 13'. Since the bevel gears 17 and 18 are both rotated in a counterclockwise direction, the circuit controlling member 11 is maintained in engagement with the stationary contact 12. Thus the engagement of circuit controlling member 10' with the stationary contact 13' completes an energizing circuit for the operating winding of the electromagnetic switch 38 from the middle of the supply lines 36 through the contact segments 56 and 57 of master controller 42, the circuit controlling member 11' and stationary contacts 13' and 12, circuit controlling member 10 and the operating winding of electromagnetic switch 38 to the upper of the supply lines 36.

Upon the resulting closure of switch 38, speed controlling resistance 31 is short circuited and the motor 30 is accelerated to full running speed.

If the master controller 42 is thrown from the right hand position through the off position into the left hand position to retard an overhauling load and operate the same in the opposite direction as previously described the electromagnetic reversing switch 41 is deenergized and the reversing switch 40 is energized to reverse the connections of the motor 30 to the supply line 36. When the opposing torque of motor 30 slows down the load and consequently the speed of bevel gear 17' decrease below that of bevel gear 18', the circuit controlling member 11' is returned to the position shown, thereby interrupting the energizing circuit of the electromagnetic switch 38. The latter opens and inserts the speed regulating resistance 31 in the secondary circuit of the motor 30. After the opposing torque of motor 30 has stopped the load and restarted the same in the counter-clockwise direction the bevel gear 17 is rotated in a clockwise direction and the bevel gear 17' is rotated in the counterclockwise direction. Hence, when the speed of motor 30 is increased by short circuiting the speed controlling resistances 33 and 32, so that the speed of bevel gear 17 exceeds that of bevel gear 18 the circuit controlling member 10 is moved from the position shown into engagement with the stationary contact 13 by rotation of the planet frame 20 and the friction band 21 in a clockwise direction. This again establishes an energizing circuit for the operating winding of electromagnetic switch 38 from the middle of the supply line 36 through the contact segments 56 and 57 of master switch 42, the circuit controlling member 11′, the stationary contact 12′ and 13, the circuit controlling member 11 and then through the operating winding of electromagnetic switch 38 to the upper of the supply lines 36. Switch 38 again closes the short circuit around the speed controlling resistance 31 and maintains the same closed as long as motor 30 operates the bevel gear 17′ faster than the bevel gear 18′.

Thus it will be seen that the speed controlling resistance 31 is maintained short circuited while the speed of motor 30 operates above a predetermined speed in either direction even though the master motor 29 rotates continuously at a substantially constant speed in one direction.

In accordance with the provisions of the patent statutes I have described the principles of operation of my invention together with the apparatus which I now consider to represent the best embodiment thereof, but I would have it understood that the apparatus shown is only illustrative and that the invention may be carried out by other means.

What I claim as new and desire to secure by Letters Patent of the United States, is:—

1. A motor controller comprising a controlling switch member operable to a plurality of positions and biased to each of said positions when operated thereto, speed responsive means for controlling the said switch member, the said means comprising an element which is moved in a direction corresponding to the relation of the speed of the motor to be controlled with respect to a substantially constant speed, and a connection between the said element and the said switch member, the said connection having a member arranged to move in the same direction with said element through a limited angular distance and then have relative movement with respect to the element throughout a further movement of the element in the same direction.

2. A motor controller comprising a controlling switch member arranged to reciprocate between two circuit controlling positions and biased to each of said positions when operated thereto, differential gear mechanism for controlling the said switch member, the said mechanism comprising an element operated at a substantially constant speed, a second element operated responsively to the speed of the motor to be controlled and a planet gear which operates in a direction depending on the relative speeds of said elements, and means connecting the said gear and the said switch member comprising a member which is connected to move in the same direction with the said gear through a limited angular distance and then have relative movement with respect to the said gear throughout further movement of the gear in the same direction.

3. In combination, an electric motor, a switch operable between two positions for controlling the speed of the motor, one for increasing the motor speed and the other for decreasing the motor speed, means for operating the said switch to each position comprising a pair of rotatable shafts one connected to be driven by the motor and the other arranged to be driven at substantially constant speed, a differential mechanism connecting the said shafts and having an element arranged to rotate in opposite directions responsively to different speed relations between said shafts, a movable member disposed in frictional engagement with said element, and a mechanical connection between said switch and said member through which the switch is operated to said one position when the motor speed is above a predetermined value and is operated to said other position when the motor speed is below said predetermined value.

4. In combination, an electric motor, a switch operable between two positions for controlling the speed of the motor, one for increasing the motor speed and the other for decreasing the motor speed, means for operating the said switch to each position comprising a pair of rotatable shafts one connected to be driven by the motor and the other arranged to be driven at substantially constant speed, a differential mechanism connecting the said shafts and having an element arranged to rotate in opposite direction responsively to different speed relations between said shafts, a movable member disposed in frictional engagement with said element, and a lost motion connection between said member and said switch through which the switch is operated to said one position when the motor speed is above a predetermined value and is operated to said other position when the motor speed is below said predetermined value.

5. In combination, an electric motor, a switch having a pivoted circuit controlling element operable between two positions for controlling the speed of the motor, one for increasing the motor speed and the other for decreasing the motor speed, means for operating the said element to each position comprising a pair of rotatable shafts one connected to be driven by the motor and the other arranged to be driven at substantially constant speed, a differential mechanism connecting the said shafts and having an element arranged to rotate in opposite directions when the motor speed is above and below a predetermined value, a movable member disposed in frictional engagement with said element, and resilient means connecting said member and said switch through which the switch is operated with a snap action to said one position when the motor speed is above said predetermined value, and is operated with a snap action to said other position when the motor speed is below said predetermined value.

6. In combination, an electric motor, a reversing switch mechanism for reversing the power connections of the motor to effect braking operation thereof, a switch operable between two positions for controlling the braking torque of the motor, means for operating the said switch to each position comprising a pair of rotatable shafts disposed in axial alignment with one of the shafts connected to be driven by the motor and the other shaft arranged to be driven at substantially constant speed in a direction corresponding to operation of said reversing switch mechanism, differential gearings connecting the said shafts and having a planet frame arranged to rotate in opposite directions responsively to different speed relations between said shafts, said frame having a circular drum surface on the periphery thereof, a friction band supported on said drum surface, and a mechanical connection between said band and said switch for operating the switch upon a reversal in the direction of rotation of said frame after reversal of the motor power connections.

7. In combination, an electric motor, a switch having a pivoted circuit controlling member operable between two positions for controlling the speed of the motor, one for increasing the motor speed and the other for decreasing the motor speed, means for operating the said member to each position comprising a pair of rotatable shafts disposed in axial alignment with one of the shafts connected to be driven by the motor and the other shaft arranged to be driven at substantially constant speed, differential gearings connecting said shafts and having a planet frame arranged to rotate in opposite directions when the motor speed is above and below a predetermined value, said frame having a circular drum surface on the periphery thereof, a friction band supported on said drum surface, and a resilient connection between said band and said circuit controlling member whereby the latter is operated to each of said positions with a snap action upon a reversal in the direction of rotation of said frame.

8. In a control system the combination with an electric motor, a speed regulating resistance for said motor, and a pivotally mounted switch operable between two positions for controlling said resistance, of means for operating said switch to automatically accelerate and decelerate the said motor from a predetermined speed comprising a master motor adapted to run at a constant speed, a differential mechanism connected to said master motor and to said first motor and having an element arranged to rotate in opposite directions when the speed of said first motor is above and below the said predetermined speed, and a yielding connection between said element and said switch mechanism for operating the said resistance controlling switch to accelerate the motor when the motor rotates above said predetermined speed and to decelerate the motor when the motor rotates below said predetermined speed.

9. In a control system, the combination with an electric motor, and speed controlling switch mechanism for the motor, of means for operating the said switch mechanism to automatically accelerate and decelerate said motor from a predetermined speed comprising a substantially constant speed electric motor, and a differential mechanism connected to each of said motors and having an element arranged to rotate in one direction when the first motor rotates above a predetermined speed and in the other direction when the first motor rotates below said predetermined speed, and means frictionally connecting said element and said switch mechanism to operate said speed controlling switch mechanism to accelerate the motor when said element rotates in said one direction and to decelerate the motor when said element rotates in said other direction.

10. In a control system for a reversible electric motor, the combination with a speed controlling resistance connected in circuit with the motor, and switch mechanism for controlling the said resistance, of means for operating the said switch mechanism to accelerate and decelerate said motor from a predetermined speed of rotation in either direction, comprising a master motor, a differential mechanism connected to said master motor and to said electric motor and having a rotatable element connected to said switch mechanism, and means for successively reversing the connections of said motors.

11. In a control system for a reversible electric motor, the combination with a speed controlling resistance connected in circuit with said motor, and switch mechanism for controlling a short circuit around the said resistance, of means for operating the said switch mechanism comprising a second electric motor, a differential mechanism connected to said second motor and to said first motor and having a rotatable element mechanically connected to said switch mechanism, and switch mechanism for successively reversing the connections of said second and first motors to a source of supply.

12. In a control system for a reversible electric motor, in combination, switch mechanism for reversing the connections of the motor to a source of supply, a speed controlling resistance connected in circuit with the motor, switch mechanism for controlling a shunt circuit around said resistance, and means for controlling said switch mechanism to shunt said resistance when the motor speed exceeds a predetermined value in either direction of rotation, comprising a reversible master motor, a differential mechanism connected to said master motor and to said first motor and having a movable element connected to said switch member and means for reversing said master motor before operation of said first switch mechanism.

13. In a control system for a reversible electric motor, the combination with a speed controlling resistance connected in circuit with the motor, and electromagnetic switch mechanism for opening and closing a shunt circuit around said resistance, of means for energizing said switch mechanism to close said shunt circuit around said resistance when the speed of the motor in either direction of operation exceeds a predetermined value comprising a reversible master motor, a differential switch mechanism connected to said master motor and to said first motor and connections jointly controlled by said manually controlled means and said differential switch mechanism, and means for successively reversing said motors.

14. The combination with an alternating current induction motor having a speed controlling resistance connected in the secondary circuit thereof, said motor being connected to drive and be driven by an active load, manually controlled switch mechanism for reversing the connection of said motor to a source of supply to electrically brake said load before driving the same in the opposite direction, switch mechanisms for controlling a short circuit around said resistance, and means for operating said switch mechanism to insure the short circuiting of said resistance when said motor is driven by the load and the open circuiting of said resistance when the connections of said motor are reversed, comprising a second electric motor, a differential mechanism having different rotatable elements connected to each of said motors and to said switch mechanism and means for reversing the connections of said second motor to a source of supply before the reversal of the connections of said first motor.

In witness whereof, I have hereunto set my hand this 7th day of July, 1924.

MAURICE WILFART.